US 12,460,596 B2

United States Patent
Coldren et al.

(10) Patent No.: US 12,460,596 B2
(45) Date of Patent: Nov. 4, 2025

(54) FUEL INJECTOR DRIVE SYSTEM

(71) Applicant: Caterpillar Inc., Peoria, IL (US)

(72) Inventors: Dana R. Coldren, Secor, IL (US);
Andrew O. Marrack, Peoria Heights, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 18/599,814

(22) Filed: Mar. 8, 2024

(65) Prior Publication Data
US 2025/0283437 A1 Sep. 11, 2025

(51) Int. Cl.
*F02D 41/20* (2006.01)

(52) U.S. Cl.
CPC .................. *F02D 41/20* (2013.01)

(58) Field of Classification Search
CPC ........ F02D 41/20; F02D 41/221; F02D 41/40; F02D 41/401; F02D 2041/2017; F02D 2041/2041; F02D 2041/2055; F02D 2041/2058; F02D 2041/2089; F02D 2041/2093; F02D 2041/224; F02D 41/0027; F02D 41/025; F02D 19/0647; F02D 19/0649; F02D 19/0613; F02D 19/0692; F02D 19/061; F02M 47/027; F02M 63/0064; F02M 63/0049; F02M 63/0033; F02M 55/025; Y02T 10/30
See application file for complete search history.

(56) References Cited

U.S. PATENT DOCUMENTS

| | | | |
|---|---|---|---|
| 4,905,120 A | 2/1990 | Grembowicz et al. | |
| 4,922,878 A | 5/1990 | Shinogle et al. | |
| 5,701,870 A | 12/1997 | Gottshall et al. | |
| 10,837,394 B2 * | 11/2020 | Sanada | F02D 41/38 |
| 11,293,370 B1 * | 4/2022 | Puckett | F02D 41/20 |
| 11,313,338 B1 * | 4/2022 | Marrack | F02D 41/20 |
| 11,795,887 B1 * | 10/2023 | Juchems | F02D 41/20 |
| 2003/0120418 A1 * | 6/2003 | Treichel | F02D 41/345 123/506 |
| 2019/0010889 A1 | 1/2019 | Ferrara et al. | |
| 2024/0044299 A1 * | 2/2024 | Marrack | F02D 41/20 |

* cited by examiner

*Primary Examiner* — Hai H Huynh
*Assistant Examiner* — Johnny H Hoang
(74) *Attorney, Agent, or Firm* — Bookoff McAndrews, PLLC

(57) ABSTRACT

A fuel injector drive system may include a fuel injector having a first electronically-controlled valve and a second electronically-controlled valve. The fuel injector drive system may include a fuel injector driver configured to supply current to the first electronically-controlled valve and the second electronically-controlled valve simultaneously to actuate the first electronically-controlled valve and the second electronically-controlled valve. The fuel injector drive system may also include an injection valve configured to inject fuel when the first electronically-controlled valve and the second electronically-controlled valve are actuated.

20 Claims, 6 Drawing Sheets

FUEL INJECTOR DRIVE SYSTEM

TECHNICAL FIELD

The present disclosure relates generally to methods and systems for internal combustion engine components and, more particularly, to systems and methods for a fuel injector with multiple electronically-controlled valves.

BACKGROUND

Fuel injectors for internal combustion engines are designed to inject a controllable amount of fuel. While some fuel injectors include a single electronically-controlled valve, such as a solenoid valve, other fuel injectors include multiple electronically-controlled valves. As an example, some injectors include a first valve that facilitates pressurization of fuel within the fuel injector and a second valve that facilitates injection of this pressurized fuel. These valves may be individually controlled to operate the separate valves of a particular fuel injector at different times. For example, a valve that enables fuel pressurization might be activated before or after a valve that controls injection is activated.

While injectors with individually-controlled valves offer advantages, these valves also increase the cost and complexity of the fuel injection system. For example, each electronically-controlled valve is connected to a dedicated drive circuit that supplies energy at appropriate times. Thus, some engine systems require two drive circuits for each fuel injector. To accommodate the numerous drive circuits, some engines include multiple separate control modules, these modules being in communication with each other to coordinate fuel injection events during the operation of the engine. While these systems are effective and can accurately operate an internal combustion engine, the use of multiple control modules increases the number of possible failure points and further increases cost. For example, some engines require double the number of injection drivers compared to the number of engine cylinders (e.g., a 16 cylinder engine may require 32 injection drivers).

An exemplary fuel injector control circuit is described in U.S. Pat. No. 5,701,870 ("the '870 patent") to Gottshall et al. The fuel injector control circuit described in the '870 patent can be used with a plurality of different fuel injectors and can be programmed to produce a plurality of different injector current waveforms. The control circuit includes a microprocessor with memory connected to a multiplexer and an application-specific integrated circuit. The control circuit can also be used to increase the current rise time of a specific injector current waveform. However, the '870 patent does not describe connecting the injector actuators of a single fuel injector in series or in parallel, so that a single injector driver can control both solenoids and allow the injector to inject fuel in a controlled manner while reducing power.

The systems and methods of the present disclosure may solve one or more of the problems set forth above and/or other problems in the art. The scope of the current disclosure, however, is defined by the attached claims, and not by the ability to solve any specific problem.

SUMMARY

In one aspect, a fuel injector drive system may include a fuel injector having a first electronically-controlled valve and a second electronically-controlled valve. The fuel injector drive system may include a fuel injector driver configured to supply current to the first electronically-controlled valve and the second electronically-controlled valve simultaneously to actuate the first electronically-controlled valve and the second electronically-controlled valve. The fuel injector drive system may also include an injection valve configured to inject fuel when the first electronically-controlled valve and the second electronically-controlled valve are actuated.

In another aspect, a fuel injection system may include a fuel injector having a first valve and a second valve, a fuel injector drive circuit electrically connected to the first valve of the fuel injector and to the second valve of the fuel injector to supply simultaneous current for both the first valve and for the second valve, and an electronic control module configured to generate a command for energizing the fuel injector drive circuit and generate a command for actuating the first valve and the second valve.

In still another aspect, a fuel injection method may include supplying current to a first electronically-controlled valve with an injector driver, supplying current to a second electronically-controlled valve with the injector driver simultaneously as the current is supplied to the first electronically-controlled valve, and injecting fuel via an injection valve of a fuel injector that may include the first electronically-controlled valve and the second electronically-controlled valve when the first electronically-controlled valve and the second electronically-controlled valve actuate in response to the current.

DETAILED DESCRIPTION

Both the foregoing general description and the following detailed description are exemplary and explanatory only and are not restrictive of the features, as claimed. As used herein, the terms "comprises," "comprising," "having," including," or other variations thereof, are intended to cover a non-exclusive inclusion such that a method or apparatus that comprises a list of elements does not include only those elements, but may include other elements not expressly listed or inherent to such a method or apparatus. In this disclosure, relative terms, such as, for example, "about," "substantially," "generally," and "approximately" are used to indicate a possible variation of ±10% in the stated value or characteristic. In this disclosure, the phrase "based on" encompasses both "based at least on" and "based entirely on."

Figure 1:
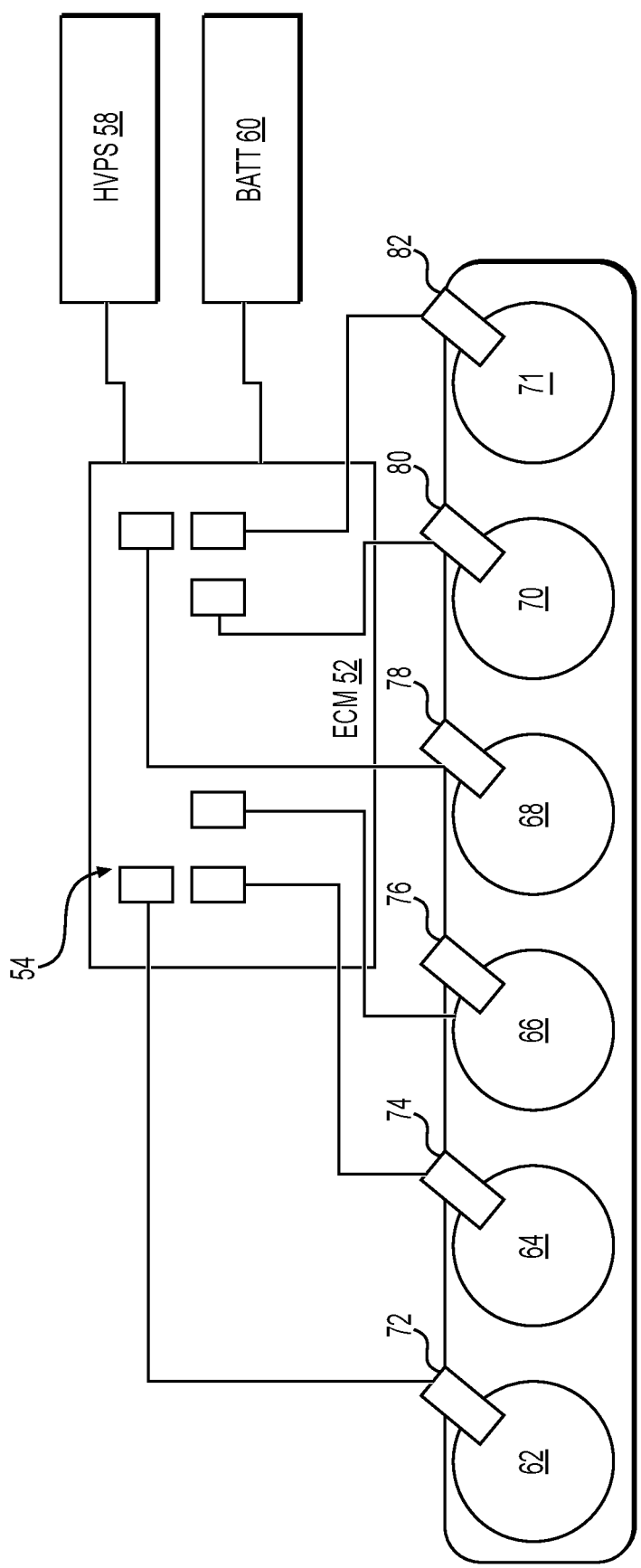
FIG. 1 is a diagram of a cylinder arrangement, according to aspects of the disclosure.

FIG. 1 illustrates an exemplary engine system 10, according to aspects of the present disclosure. Engine system 10 may be installed in an internal combustion engine. Engine system 10 may include a plurality of cylinders (62, 64, 66, 68, 70, and 71). Each of the plurality of cylinders 62, 64, 66, 68, 70, and 71 may include a respective fuel injector (72, 74, 76, 78, 80, and 82) that is controlled via a respective injector driver 54, as described below. Each of the fuel injectors may be electrically connected to an electronic control module (ECM) 52. ECM 52 may be electrically connected to a high-voltage power system (HVPS) 58 and to a battery 60. While FIG. 1 is illustrated with six cylinders, one of ordinary skill in the art will appreciate that the aspects of the present disclosure may be applicable to a variety of engines, including engines with four, six, eight, ten, twelve, or twenty cylinders.

Figure 2:
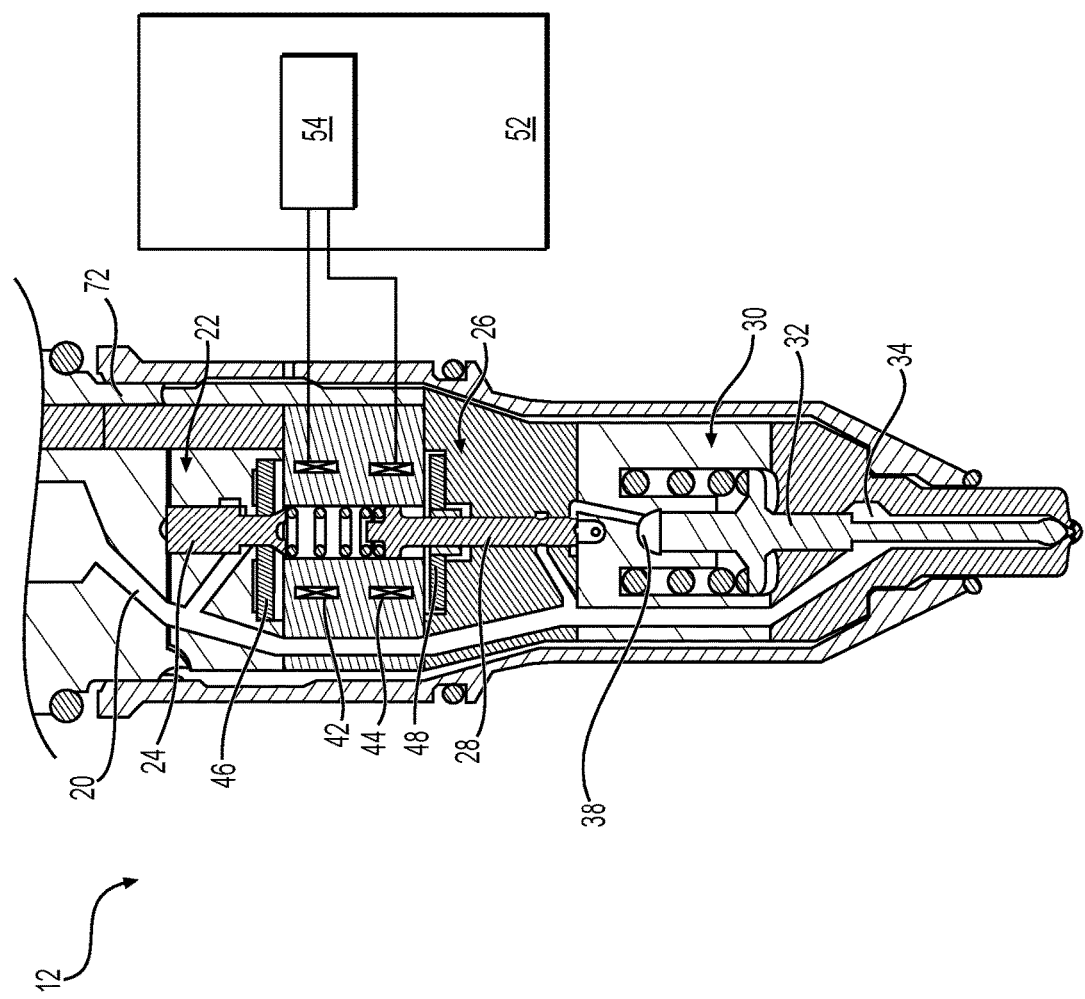
FIG. 2 is a schematic cross-sectional view of a fuel injection system, according to aspects of the disclosure.

FIG. 2 illustrates an exemplary fuel injector drive system 12 of engine system 10, according to aspects of the present disclosure. Fuel injector drive system 12 may include fuel injector 72 and ECM 52 that includes a plurality of injector drivers (e.g., injector drivers 54) that are electrically connected to valves of fuel injector 72. Fuel injector 72 may be installed in an internal combustion engine having a plurality of engine cylinders as described with respect to FIG. 1. In some aspects, fuel injector drive system 12 may be one of a plurality of fuel injector drive systems designed to be identical to each other (e.g., fuel injector drive system 12 and the plurality of fuel injector drive systems may be structurally identical) and may be fuel injector drive systems of the same type, such as fuel injector drive systems having the same model number. Each of the plurality of fuel injector drive systems may correspond with a cylinder of an internal combustion engine having a plurality of cylinders. It should be understood that while injector 72 is shown and described as having two solenoids corresponding to two valves, injector 72 may have additional solenoids corresponding to additional valves (e.g., three solenoids corresponding to three valves).

Fuel injector 72 and fuel injectors 74, 76, 78, 80, and 82 may be designed to be identical to each other (e.g., one or more of fuel injectors 72, 74, 76, 78, 80, and 82 may be structurally identical) and may be fuel injectors of the same type, such as fuel injectors having the same model number. Therefore, the description of fuel injector 72 also applies to fuel injectors 74, 76, 78, 80, and 82, except when indicated otherwise.

Fuel injector 72 may be a mechanically-actuated electronically-controlled unit injector including a body that houses a camshaft-driven piston (not shown), a fuel passage 20 to receive fuel pressurized when this piston is pressed by the camshaft, an electronically-controlled spill valve 22, an electronically-controlled control valve 26, and an injection valve 30. Spill valve 22 may be a normally-open valve including a valve member 24 that is movable between an open position and a closed position. A spring member may act to bias spill valve member 24 to the open position. When the valve member 24 is in the open position, spill valve 22 may allow fuel to drain and return to the fuel supply system. When in the closed position, spill valve 22 may enable pressurization of fuel via the piston of fuel injector 72. Spill valve 22 may include a spill valve solenoid 42 for actuating spill valve member 24 due to movement of a spill valve armature 46 to which valve member 24 is connected. Spill valve solenoid 42 may be energized in response to commands from ECM 52, the energized state acting to move spill valve 22 to the closed position.

Control valve 26 may be connected between pressurized fuel supply passage 20 and a control chamber 38. Control valve member 28 may have a non-injection position and an injection position. When in the non-injection position, control valve 26 may enable fluid communication between control chamber 38 and fuel that is pressurized with a piston, filling chamber 38 with fluid. When control valve member 28 is in the injection position, control chamber 38 may be depressurized by allowing fuel in chamber 38 to drain from fuel injector 72 to the low pressure fuel supply and drain system. Control valve 26 may be brought to the injection position due to electromagnetic force created by supplying current to control valve solenoid 44.

Injection valve 30 may be a one-way valve formed with a spring, an injection valve member 32 biased by the spring, and control chamber 38. An upper hydraulic surface of injection valve member 32 may face control chamber 38. When high-pressure fluid is present in control chamber 38, injection valve member 32 may be secured in a closed position, even when pressurized fuel is present in injection chamber 34, due to the ability of fluid within control chamber 38 to block movement of injection valve member 32. When injection is desired, fluid may be permitted to drain from control chamber 38, as described below, allowing pressurized fuel to lift injection valve member 32 by acting on a lower hydraulic surface of injection valve member 32.

ECM 52 may be an electronic control module that controls one or more aspects of fuel injection drive system 12, including the behavior of an internal combustion engine. ECM 52 may be implemented as a single control unit that controls multiple aspects of system 12 and, in particular, control of every fuel injector present in system 12 (e.g., fuel injector 72 in the internal combustion engine of system 12). ECM 52 may be enabled, via programming, to generate commands that control fuel injection events, including commands for a fuel injector drive circuit (also referred to herein as a "fuel injector driver" or "injector driver") that includes solenoids of a fuel injector. ECM 52 may also be configured, via programming, to monitor performance of valves of the fuel injector and, based on fuel injector currents, determine when valves connected to a fuel injector driver operate abnormally (e.g., due to an open circuit, a short circuit, valve sticking, etc.). ECM 52 may be configured to generate a notification based on an identified abnormality, this notification identifying the fuel injector in which the abnormality occurred. If desired, ECM 52 may also be configured to monitor valve return times based on current induced by motion of spill valve member 24 and, in some embodiments, control valve member 28. Based on the valve return time of spill valve member 24, for example, ECM 52 may be configured to adjust timing of valve 22 in one or more injection events.

ECM 52 may embody a single microprocessor or multiple microprocessors that receive inputs and generate outputs. ECM 52 may include a memory, a secondary storage device, a processor such as a central processing unit, or any other means for accomplishing a task consistent with the present disclosure. The memory or secondary storage device associated with ECM 52 may store data and software to allow ECM 52 to perform its functions, including the functions described with respect to fuel injection method 600, described below. Numerous commercially available microprocessors can be configured to perform the functions of ECM 52. Various other known circuits may be associated with ECM 52, including signal-conditioning circuitry, communication circuitry, drive circuitry, power-source command circuitry, and other appropriate circuitry. ECM 52 may include circuitry for controlling a single injector driver to simultaneously supply power to a pair of solenoid valves of a respective fuel injector, as described below. ECM 52 may include circuitry for HVPS 58 configured to boost a voltage of electrical energy applied to solenoids 42 and 44. While HVPS 58 is shown outside of ECM 52, HVPS 58 may instead be implemented within ECM 52. Further, while injector driver 54 is shown as a component of ECM 52, in at least some configurations, injector driver 54 is partially or entirely external to ECM 52. In some embodiments, ECM 52 may be configured to control the application of energy to solenoids 42 and 44 via battery 60 and HVPS 58. ECM 52 may issue commands to selectively energize solenoids 42 and 44 with electrical power from battery 60 and/or HVPS 58, and de-energize solenoids 42 and 44 to control a rate of decay of electrical energy (e.g., current through coils of solenoids 42 and 44).

ECM 52 may also be configured to detect valve return times based on current induced in the injector drive circuit (e.g., driver 54). For example, the return of spill valve member 24 at the end of actuation may induce current, a peak of this current corresponding to the return time. This return time of valve member 24 may occur after control valve member 28 has returned and after the termination of current generated with command 102. Thus, induced current within the drive circuit after the termination of command 102 may correspond to valve member 24, allowing ECM 52 to compare a detected return timing to a desired return timing, as described below. Based on the detected return timing, ECM 52 may modify one or more future commands 102 to provide improved control over spill valve 22.

Figure 3:
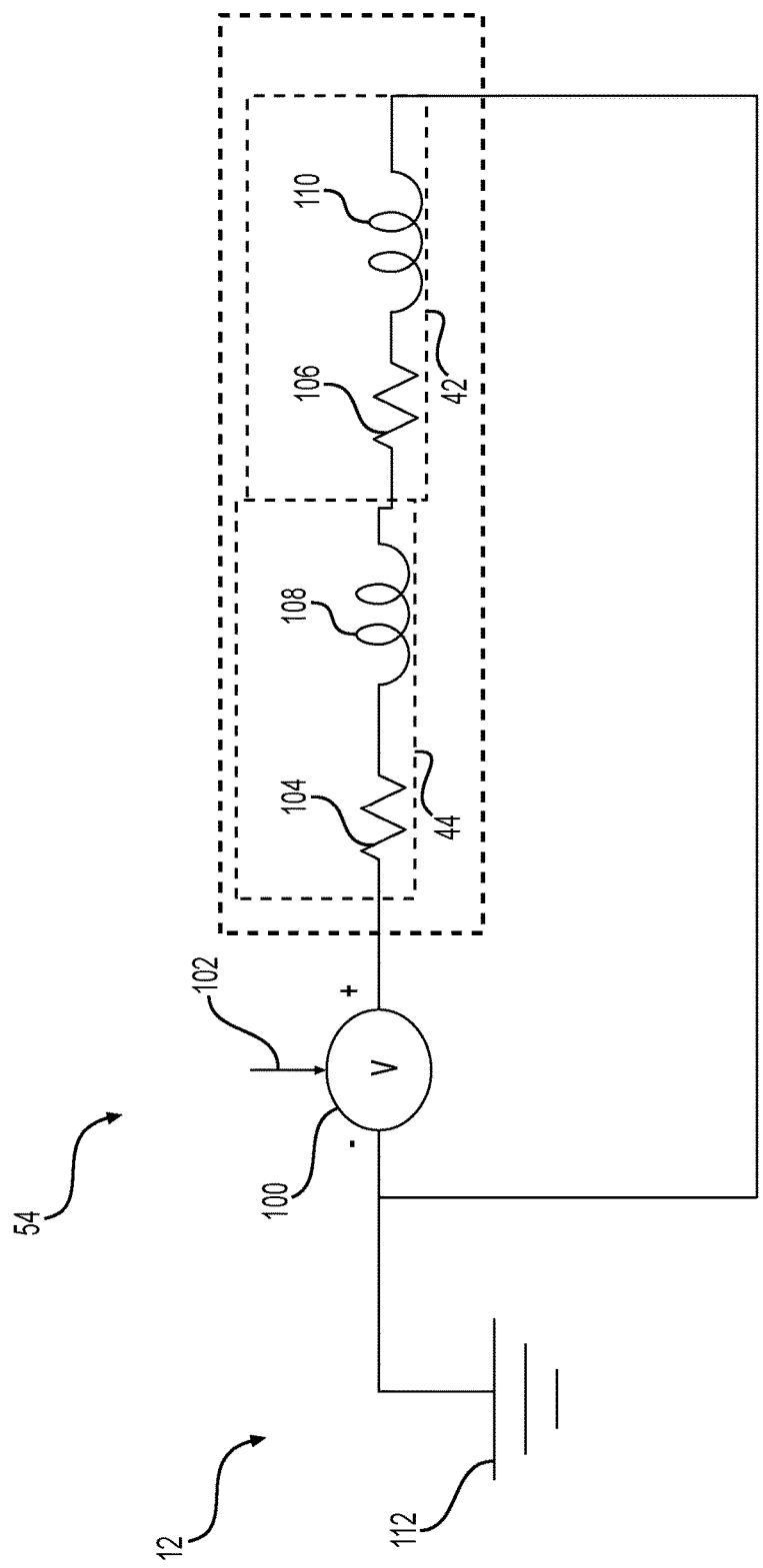
FIG. 3 is a diagram illustrating a first example of a drive circuit for paired fuel injector valves useful in the fuel injection system of FIG. 2, according to aspects of the disclosure.

FIG. 3 is a diagram illustrating an exemplary drive circuit 54 for driving fuel injector 72. The drive circuit 54 may include a voltage source 100 (e.g., HVPS 58 and/or battery 60) configured to receive a voltage command 102, a first solenoid (e.g., control valve solenoid 44) having a first resistance 104 and a first inductance 108, and a second solenoid (e.g., spill valve solenoid 42) having a second resistance 106 and a second inductance 110. The drive circuit 54 may also include a ground potential 112. Electrical components for two valves of a single fuel injector, such as solenoids 42 and 44 for spill valve 22 and control valve 26, respectively, may be electrically connected in series with each other as shown in FIG. 3.

Electrically connecting the injector actuators (e.g., solenoids 42 and 44) in series may allow a single injector driver (e.g., injector driver 54) to control both solenoids 42 and 44 simultaneously and allow the injector driver 54 to inject fuel in a controlled manner while staying under a power supply limit. This simultaneous control may result in current being supplied in both solenoids 42 and 44 for the same amount of time for every fuel injection event. However, characteristics of the two valves, such as one valve being more quickly actuated than the other when supplied with the same quantity of current, may cause the valves to be actuated for different periods of time when exposed to the same amount of energy simultaneously.

Voltage source 100 may be responsive to voltage commands 102 issued by ECM 52. These commands may selectively open and close the drive circuit such that, when the drive circuit is closed, voltage source 100 is connected and current flows through both solenoid 42 and solenoid 44. When both solenoids 42 and 44 are acting in an intended manner, the flow of current may energize both solenoids simultaneously.

Current through solenoids 42 and 44 may be impacted by resistance 104, resistance 106, inductance 108, and inductance 110. The flow of current, and in particular, the rise time of current within the drive circuit during the application of an approximately constant voltage, may be monitored to facilitate diagnostics of the valves associated with solenoids 42 and 44.

Figure 4:
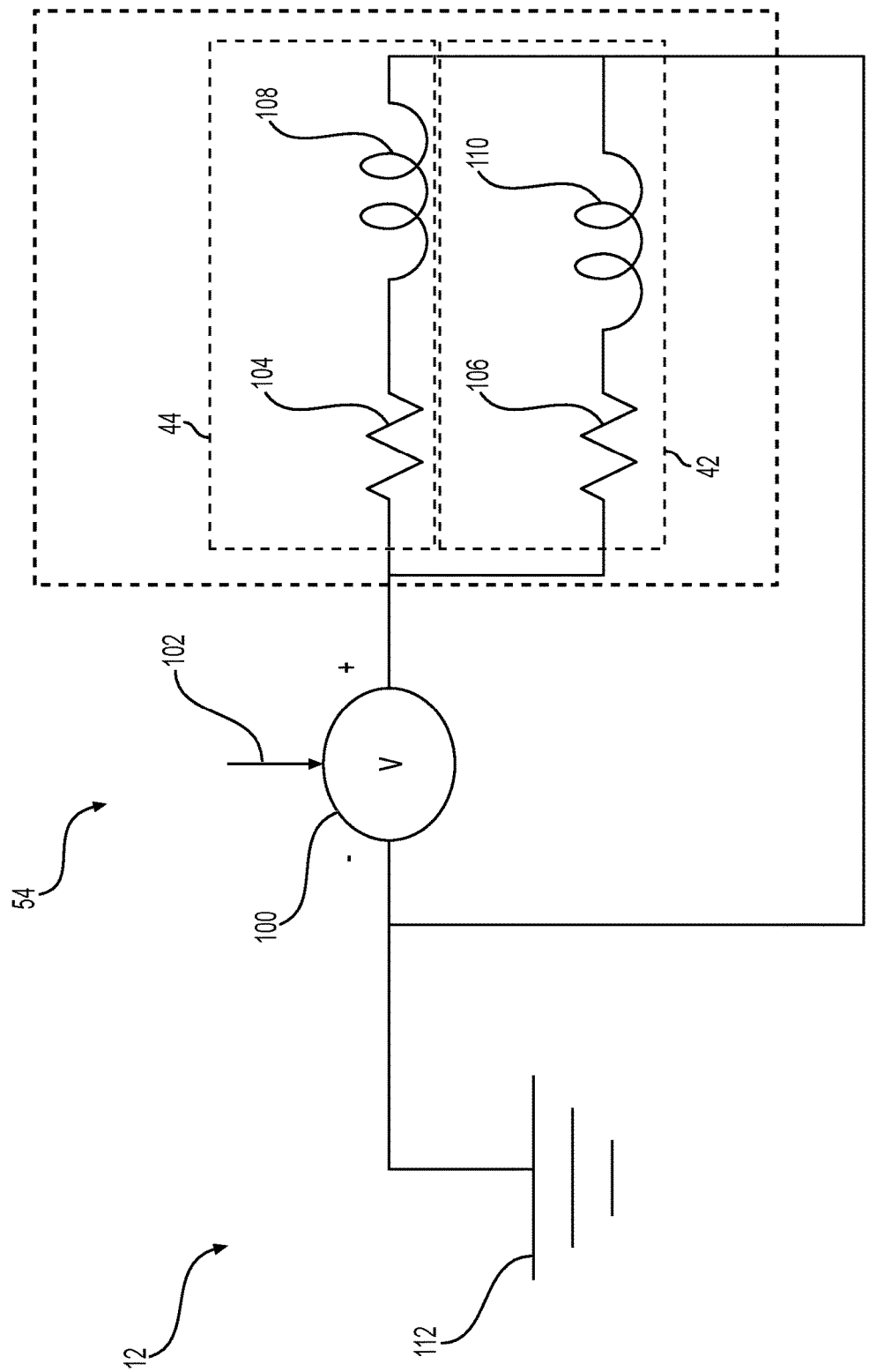
FIG. 4 is a diagram illustrating a second example of a drive circuit for paired fuel injector valves useful in the fuel injection system of FIG. 2, according to aspects of the disclosure.

FIG. 4 is a diagram illustrating another exemplary drive circuit 54 for driving valves of fuel injector 72. As described above, drive circuit 54 may include a voltage source 100 configured to receive a voltage command 102, a first solenoid 44, a second solenoid 42, and a ground potential 112. The electrical elements illustrated in FIG. 4 may feature any of the features or characteristics of the electrical elements described in FIG. 3.

FIG. 4 depicts solenoids 44 and 42 connected electrically in parallel. This parallel connection may also allow a single driver 54 to provide electrical energy to both solenoids 44 and 42 simultaneously, in the manner described above. One of ordinary skill in the art will appreciate that the parallel arrangement of solenoids 44 and 42 as shown in FIG. 4 may require additional current as compared to the series arrangement illustrated in FIG. 3. Therefore, voltage source 100 may be scaled upward as necessary for actuating electronically-controlled spill valve 22 and electronically-controlled control valve 26 of a single injector 72.

INDUSTRIAL APPLICABILITY

System 12 may be useful in any internal combustion engine, such as liquid fuel (e.g., diesel, gasoline, etc.) engines, gaseous fuel engines, or dual-fuel engines (engines configured to combust two types of fuels). For example, a dual-fuel engine may combust a gaseous fuel (e.g., natural gas) and a liquid fuel (e.g., diesel fuel), a first liquid fuel (e.g., diesel fuel) and a second liquid fuel (e.g., methanol), or a first gaseous fuel and a second gaseous fuel. System 12 may be utilized for generating power in a stationary machine (e.g., a generator or other electricity-generating device), in a mobile machine (e.g., an earthmoving device, a hauling truck, a drilling machine, etc.), or in other applications in which it is beneficial to install a plurality of fuel injectors in an internal combustion engine and connect two or more injector solenoids such that each fuel injector is driven by a single injector driver.

During an injection event, the pressure of fuel within pressurized fuel passage 20 (FIG. 1) may increase when spill valve 22 is closed and a camshaft drives the piston within fuel injector 72 downward. Control valve 26 may control whether fluid (e.g., fuel) within control chamber 38 is pressurized.

When fuel injection is desired in a particular cylinder (e.g., cylinder 62) of system 12, ECM 52 may generate a drive circuit command 102 to a drive circuit 54 for the injector (e.g., injector 72) installed in that cylinder. For example, ECM 52 may generate voltage command 102 (FIGS. 3 and 4) to supply electrical energy to a first valve of injector via injector driver 54 (FIG. 1). This energy may actuate the first valve of fuel injector 72, spill valve 22, and move spill valve member 24 of fuel injector 72 to the closed position.

The same command 102 may cause valve member 28 of control valve 26 of fuel injector 72 to move to the injection position. This actuation may allow fluid within control chamber 38 to drain via a low-pressure fluid passage (e.g., a fluid drain). Pressurized fuel within injection chamber 34 of fuel injector 72 may then lift injection valve member 32 and permit injection of fuel. It should be noted that command 102, while referred to as a single command, may include a plurality of instructions (e.g., a plurality of commands) and may cause a plurality of actions to be performed by components electrically connected to a drive circuit (e.g., drive circuit 54).

Figure 5:
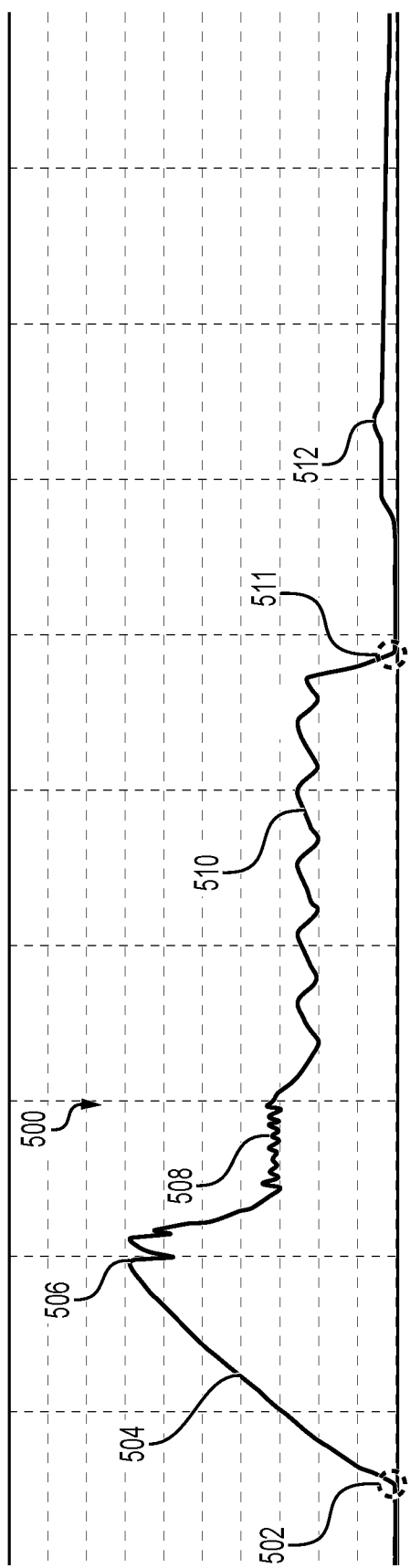
FIG. 5 is a chart showing exemplary current waveform for the system of FIG. 1, according to aspects of the disclosure.

FIG. 5 is a chart showing an exemplary waveform 500 that may represent an amount of current through a drive circuit (e.g., injector driver 54) electrically connected to spill valve solenoid 42 and control valve solenoid 44 (e.g., in series as shown in FIG. 3). Waveform 500 may represent an amount of current (y-axis) supplied through both spill valve solenoid 42 and control valve solenoid 44 over time (x-axis) during an injection event. As used herein, an "injection event" refers to an injection of fuel, directly or indirectly, to a combustion chamber, and includes a main injection, a pilot injection, and/or a post injection. In some aspects, an injection event includes at least a main injection.

Waveform 500 may begin with a start of current 502. Ramp-up current 504 may be applied for a period of time beginning at start of current 502 and ending at the beginning of a pull-in portion 506.

Waveform 500 may include, in addition to ramp-up current 504, a pull-in portion 506, a first hold-in portion 508, and a second hold-in portion 510. Pull-in portion 506 may include a maximum current present in waveform 500. Hold-in portion 508 of waveform 500 follows pull-in portion 506 and may include one or more current tiers that are smaller than the hold-in current. In the example illustrated in FIG. 5, hold-in portion 508 includes an intermediate current level between pull-in portion 506 and hold-in portion 510.

Hold-in portion 510 of waveform 500 follows hold-in portion 508 and may include one or more current tiers that are smaller in magnitude than hold-in portion 508. In the example illustrated in FIG. 5, pull-in portion 506, hold-in portion 508 and hold-in portion 510 includes "chopped" current levels that include repeated minima and maxima, but this is not required. A chopped current may be a current that is interrupted or modulated at specific current amplitudes, times, or other intervals. While waveform 500 is illustrated at different amplitudes (heights) in FIG. 5, these heights are exemplary, with a current of zero amps being represented by the beginning of waveform 500 on the left-hand side of FIG. 5 showing the beginning the waveform 500.

As understood, the amplitude of the current supplied to spill valve solenoid 42 and control valve solenoid 44 may be correlated with the amount of force generated to pull and hold spill valve member 24 and control valve member 28, respectively, in their actuated positions. A higher pull-in current associated with pull-in-portion 506 may generate a greater amount of force, for example, to cause spill valve member 24 and control valve member 28 to each overcome static friction and other forces to move to the closed position and injection position, respectively. Lower levels of current (e.g., hold-in current 508, 510) may generate lower forces. In many instances, these forces may be sufficient to maintain spill valve 22 and control valve 26 in their respective actuated positions.

Following end of current 511, energy in solenoid 44 may generate a reduced amount of magnetic force that no longer holds spill valve member 24 in the open position. When spill valve member 24 returns from the actuated position (closed or injection position) to the resting position (open or non-injection position), this movement may generate, via induction, a freewheeling current having a peak 512. This freewheeling current peak 512 corresponds to the timing at which spill valve member 24 returns to the resting position (e.g., by contacting a valve seat associated with the open, non-injection position). The time between end of current 511 and current peak 514, forms a valve return time, the amount of time that elapses between the end of the current and the actual return of the valve member, spill valve member 24, to a corresponding seat.

Figure 6:
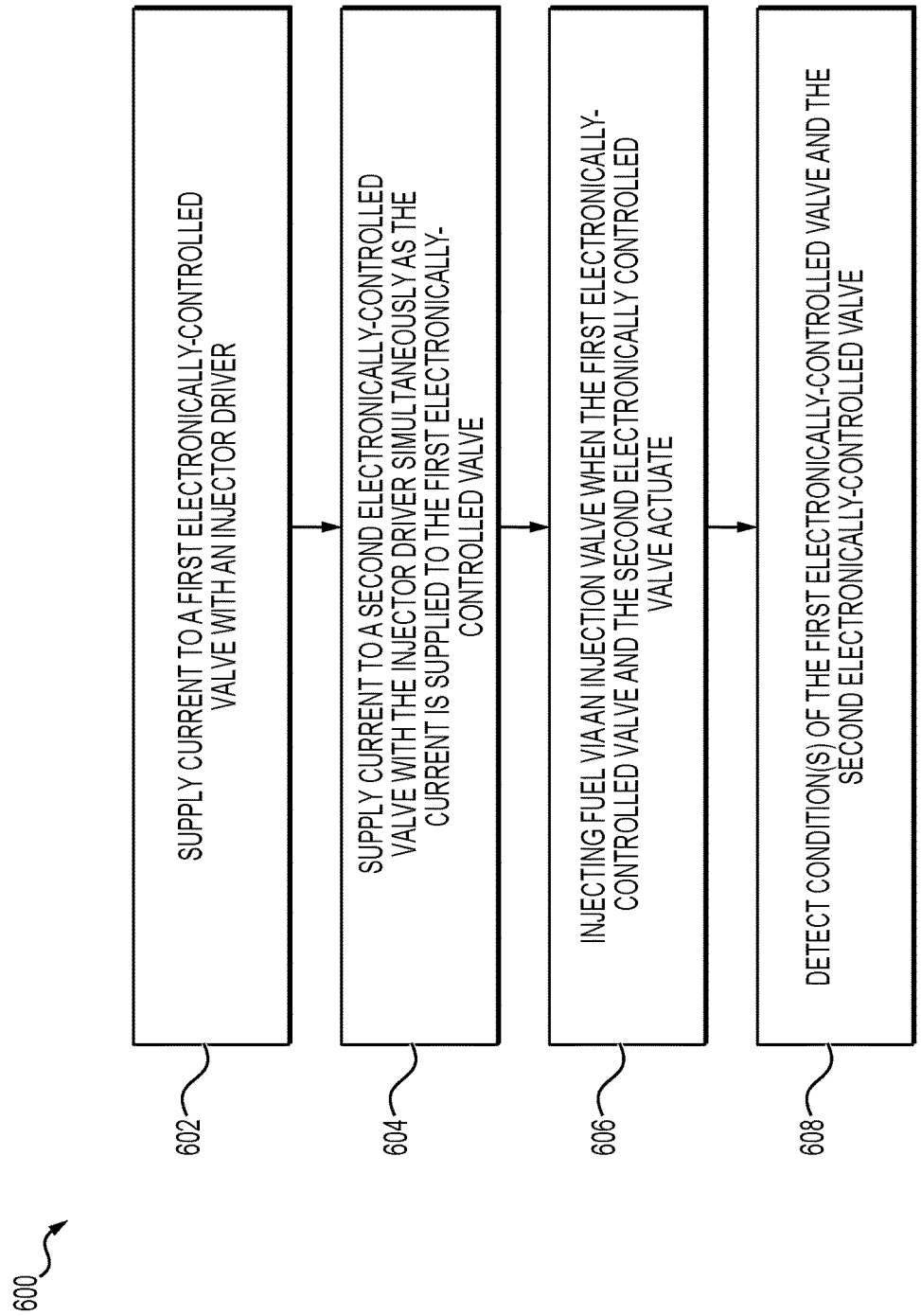
FIG. 6 is a flowchart depicting an exemplary fuel injection method, according to aspects of the disclosure.

FIG. 6 shows a flowchart illustrating an exemplary fuel injection method 600 for injecting fuel, according to aspects of the disclosure. It should be understood that in some aspects, at least part of the method 600 may be commands issued by ECM 52 of system 10. In some aspects, a command may contain one or more instructions, and each of the one or more instructions may cause one or more actions to be performed by one or more elements electrically connected to drive circuit 54, as described above. For example, voltage command 102 generated by ECM 52 may contain instructions to cause the steps 602 and 604 to be performed by one or more elements electrically connected to drive circuit 54.

A first step 602 of method 600 may include supplying current to a first electronically-controlled valve with an injector driver (e.g., drive circuit 54). This may correspond with start of current 502 as illustrated in FIG. 5. For example, ECM 52 may generate voltage command 102 that causes current to be supplied to electronically-controlled spill valve 22 (via solenoid 42). As noted above, electronically-controlled spill valve 22 may be electrically connected to electronically-controlled control valve 26 in series or in parallel.

A second step 604 of method 600 may include supplying current to a second electronically-controlled valve with the same injector driver (e.g., drive circuit 54), simultaneously as the current is supplied to the first electronically-controlled valve. For example, ECM voltage command 102 may cause current to supplied to electronically-controlled control valve 26 (via solenoid 44). Energizing (e.g., supplying current to) the solenoid 42 and the solenoid 44 may actuate the first electronically-controlled valve and the second electronically-controlled valve at different times, although in some embodiments the actuation of the two valves begins at the same time. Steps 602 and 604 may therefore be performed entirely contemporaneously for a single injector 72 associated with a single drive circuit 54.

A third step 606 of method 600 may include injecting fuel via an injection valve when the first electronically controlled valve and the second electronically controlled valve actuate due to the simultaneous supply of current for valves 22 and 26. For example, injection valve 30 may inject fuel after the spill valve 22 and the control valve 26 are actuated in steps 602 and 604.

A fourth step 608 may be performed continuously or intermittently during method 600. Step 608 is optional and is not included in all embodiments. During step 608, ECM 52 may monitor a fuel injector (e.g., fuel injector 72) installed in an internal combustion engine to identify issues, such as faults, in particular spill and control valves (e.g., spill valve 22 and control valve 26) of the injector. For example, ECM 52 may be configured to monitor current rise times when command 102 is generated. A current rise time may be associated with a particular fault or issue. Similarly, ECM 52 may also be configured to monitor induced current peaks 512 after command 102 is no longer generated. For example, induced current peaks 512 that occur later than expected after end of current 511 may be indicative of a particular fault or issue, such as a sticking valve. ECM 52 may include circuitry for communicating via wireless and/or wired connections to a display device within system 12 or at a remote location, so as to enable ECM 52 to cause display of notifications. For example, ECM 52 may determine that a current rise time was abnormally fast. ECM 52 may generate and transmit a notification based on the abnormally fast rise time. The transmitted notification of the abnormally fast rise time may be shown to a user via a display, for example.

In some aspects, the disclosed system and method may enable a single injector driver to control two solenoids to control and power engines with a relatively large number of fuel injectors, such as an engine with 16 fuel injectors, 20 fuel injectors, or more. The system may realize cost reduction by the reduction in the required number of injector drivers (e.g., by including half the number of injector drivers as compared to fuel injectors), and may improve reliability by avoiding the need to provide communication connections, which may become loose, damaged, or even severed, during operation.

It will be apparent to those skilled in the art that various modifications and variations can be made to the disclosed system and method without departing from the scope of the disclosure. Other embodiments of the system and method will be apparent to those skilled in the art from consideration of the specification and system and method disclosed herein. It is intended that the specification and examples be considered as exemplary only, with a true scope of the disclosure being indicated by the following claims and their equivalents.

What is claimed is:

1. A fuel injector drive system, comprising:
    a fuel injector having:
        a first electronically-controlled valve; and
        a second electronically-controlled valve;
    a fuel injector driver configured to supply current to the first electronically-controlled valve and the second electronically-controlled valve simultaneously to actuate the first electronically-controlled valve and the second electronically-controlled valve; and
    an injection valve configured to inject fuel when the first electronically-controlled valve and the second electronically-controlled valve are actuated.

2. The fuel injector drive system of claim 1, further comprising:
    a first solenoid that, when energized, actuates the first electronically-controlled valve; and
    a second solenoid that, when energized, actuates the second electronically-controlled valve.

3. The fuel injector drive system of claim 2, wherein the first solenoid and the second solenoid are electrically connected in series to each other.

4. The fuel injector drive system of claim 2, wherein the first solenoid and the second solenoid are electrically connected in parallel to each other.

5. The fuel injector drive system of claim 2, wherein the fuel injector driver is configured to energize the first solenoid and the second solenoid simultaneously.

6. The fuel injector drive system of claim 5, wherein energizing the first solenoid and the second solenoid actuates the first electronically-controlled valve and the second electronically-controlled valve at different times.

7. The fuel injector drive system of claim 1, wherein the first electronically-controlled valve is a spill valve configured to control pressure of fuel within the fuel injector.

8. The fuel injector drive system of claim 1, wherein the second electronically-controlled valve is an injection control valve.

9. The fuel injector drive system of claim 1, wherein the fuel injector drive system includes a plurality of fuel injectors and a plurality of fuel injector drivers, a quantity of fuel injectors being equal to a number of fuel injector drivers.

10. A fuel injection system, comprising:
    a fuel injector having a first valve and a second valve;
    a fuel injector drive circuit electrically connected to the first valve of the fuel injector and to the second valve of the fuel injector to supply simultaneous current for both the first valve and for the second valve; and
    an electronic control module configured to:
        generate a command for energizing the fuel injector drive circuit; and
        generate a command for actuating the first valve and the second valve.

11. The fuel injection system of claim 10, further comprising:
    a first solenoid that, when energized, actuates the first valve; and
    a second solenoid that, when energized, actuates the second valve.

12. The fuel injection system of claim 11, wherein the first solenoid and the second solenoid are electrically connected in series.

13. The fuel injection system of claim 11, wherein the first solenoid and the second solenoid are electrically connected in parallel.

14. The fuel injection system of claim 10, wherein the fuel injection system is a first fuel injection system of a plurality of fuel injection systems, each of the plurality of fuel injection systems corresponding to a cylinder of a plurality of cylinders of an internal combustion engine.

15. The fuel injection system of claim 14, wherein a quantity of fuel injectors and a quantity of fuel injector drive circuits of the plurality of fuel injection systems are both equal to a quantity of cylinders of the plurality of cylinders.

16. A fuel injection method, comprising:
    supplying current to a first electronically-controlled valve with an injector driver;
    supplying current to a second electronically-controlled valve with the injector driver simultaneously as the current is supplied to the first electronically-controlled valve; and
    injecting fuel via an injection valve of a fuel injector that includes the first electronically-controlled valve and the second electronically-controlled valve when the first electronically-controlled valve and the second electronically-controlled valve actuate in response to the current.

17. The fuel injection method of claim 16, further including:
    detecting one or more conditions of the first electronically-controlled valve or the second electronically-controlled valve based on current supplied via the injector driver.

18. The fuel injection method of claim 16, wherein the injector driver that simultaneously supplies current to the first electronically-controlled valve and to the second electronically-controlled valve is a single injector driver.

19. The fuel injection method of claim 18, wherein the first electronically-controlled valve and to the second electronically-controlled valve are electrically connected in series to each other.

20. The fuel injection method of claim 16, wherein the first electronically-controlled valve of the fuel injector is a spill valve and the second electronically-controlled valve of the fuel injector is a control valve.

* * * * *